US011262627B2

(12) United States Patent
Lin

(10) Patent No.: US 11,262,627 B2
(45) Date of Patent: Mar. 1, 2022

(54) LIQUID CRYSTAL DISPLAY PANEL AND DISPLAY DEVICE

(71) Applicant: Shenzhen China Star Optoelectronics Semiconductor Display Technology Co., Ltd., Shenzhen (CN)

(72) Inventor: Yunglun Lin, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 148 days.

(21) Appl. No.: 16/758,047

(22) PCT Filed: Jan. 14, 2020

(86) PCT No.: PCT/CN2020/071882
§ 371 (c)(1),
(2) Date: Apr. 22, 2020

(87) PCT Pub. No.: WO2021/128512
PCT Pub. Date: Jul. 1, 2021

(65) Prior Publication Data
US 2021/0405470 A1     Dec. 30, 2021

(30) Foreign Application Priority Data
Dec. 26, 2019  (CN) .......................... 201911363392.7

(51) Int. Cl.
*G02F 1/1362*   (2006.01)
*G02F 1/1333*   (2006.01)
*G02F 1/1343*   (2006.01)

(52) U.S. Cl.
CPC .. *G02F 1/136209* (2013.01); *G02F 1/133388* (2021.01); *G02F 1/134336* (2013.01); *G02F 1/134345* (2021.01)

(58) Field of Classification Search
None
See application file for complete search history.

(56) References Cited

U.S. PATENT DOCUMENTS 9,829,755 B1 * 11/2017 Tae ................... G02F 1/134309
2016/0120005 A1    4/2016 Wu et al.

FOREIGN PATENT DOCUMENTS

| CN | 107481623 | 12/2017 |
|---|---|---|
| CN | 108364568 | 8/2018 |
| CN | 110047390 | 7/2019 |
| CN | 110136583 | 8/2019 |
| CN | 110275343 | 9/2019 |
| JP | 2006-349811 | 12/2006 |
| JP | 2017-142368 | 8/2017 |

* cited by examiner

Primary Examiner — Richard H Kim

(57) ABSTRACT

The present disclosure provides a liquid crystal display panel and a display device. The liquid crystal display panel comprises a display region and a non-display region disposed around the display region, and the display region comprises a center region and edge regions located at four corners of the center region. Pixels in the liquid crystal display panel comprise a main-pixel region and a sub-pixel region, wherein the pixels comprise first pixels intersecting a boundary line between the edge regions and the non-display region, and at least two first pixels are symmetrical about a horizontal centerline. Brightness of an upper portion and a lower portion of the horizontal center line are same in the present disclosure.

20 Claims, 4 Drawing Sheets

LIQUID CRYSTAL DISPLAY PANEL AND DISPLAY DEVICE

RELATED APPLICATIONS

This application is a National Phase of PCT Patent Application No. PCT/CN2020/071882 having International filing date of Jan. 14, 2020, which claims the benefit of priority of Chinese Patent Application No. 201911363392.7 filed on Dec. 26, 2019. The contents of the above applications are all incorporated by reference as if fully set forth herein in their entirety.

FIELD AND BACKGROUND OF THE INVENTION

The present disclosure relates to the display technology field, and more particularly, to a liquid crystal display panel and a display device.

In vertical alignment type liquid crystal display panels, in order to achieve a wide-viewing angle effect, each pixel comprises a main-pixel region and a sub-pixel region. A light transmittance of the main-pixel region is greater, and a light transmittance of the sub-pixel region is lower. In current round-corner liquid crystal display panels, pixels are arranged in a rectangular array, and four corners of the round-corner liquid crystal display panels are round-corners, so that the pixels at the round-corners will be partially shielded. When all the pixels are aligned, that is, each of the pixels is arranged with the main-pixel region in an upper row and the sub-pixel region in a lower row, or the main-pixel region in the lower row and the sub-pixel region in the upper row, a region shielded by the pixels at the upper round-corners is not exactly same as a region shielded by the pixels at the lower round-corners. Because light transmittances of the main-pixel region and the sub-pixel region are not same, brightness of the pixels at the upper round-corners and the lower round-corners will be different during display, resulting in a difference in brightness and viewing angles at the upper round-corners and the lower round-corners, which affects display effect.

Thus, there are technical problems of different brightness and viewing angles at the upper round-corners and the lower round-corners in the current round-corner liquid crystal display panels, which need to be relieved.

SUMMARY OF THE INVENTION

The present disclosure provides a display panel and a display device to relieve the technical problems of different brightness and viewing angles at the upper round-corners and the lower round-corners in the current round-corner liquid crystal display panels.

In order to solve the above problems, the present disclosure provides technical solutions as follows.

The present disclosure provides a liquid crystal display panel, the liquid crystal display panel comprises a display region and a non-display region disposed around the display region. The display region comprises a center region and edge regions located at four corners of the center region. The liquid crystal display panel further comprises a plurality of pixels arranged in an array, the pixels comprise a main-pixel region and a sub-pixel region, and a light transmittance of the main-pixel region is greater than a light transmittance of the sub-pixel region, wherein the pixels comprise first pixels intersecting a boundary line between the edge regions and the non-display region, a partial region of the first pixels is shielded by a black matrix, and at least two first pixels are symmetrical about a horizontal centerline of the liquid crystal display panel.

In the liquid crystal display panel of the present disclosure, in the first pixels that are symmetrical about the horizontal centerline, all the sub-pixel regions are close to the horizontal centerline, and all the main-pixel regions are away from the horizontal centerline.

In the liquid crystal display panel of the present disclosure, in the first pixels that are symmetrical about the horizontal centerline, all the main-pixel regions are close to the horizontal centerline, and all the sub-pixel regions are away from the horizontal centerline.

In the liquid crystal display panel of the present disclosure, the boundary line comprises a first boundary line and a second boundary line that are symmetrical about the horizontal centerline, and a third boundary line and a fourth boundary line that are symmetrical about the horizontal centerline. The first boundary line and the second boundary line form a first boundary group, and the third boundary line and the fourth boundary line form a second boundary group. The first pixels that are symmetrical about the horizontal centerline intersect at least one of the first boundary group or the second boundary group.

In the liquid crystal display panel of the present disclosure, the first pixels that are symmetrical about the horizontal centerline intersect the first boundary group and does not intersect the second boundary group.

In the liquid crystal display panel of the present disclosure, the first pixels that are symmetrical about the horizontal centerline intersect the second boundary group and does not intersect the first boundary group.

In the liquid crystal display panel of the present disclosure, the first pixels that are symmetrical about the horizontal centerline intersect both the first boundary group and the second boundary group.

In the liquid crystal display panel of the present disclosure, all the first pixels are symmetrical about the horizontal centerline.

In the liquid crystal display panel of the present disclosure, the boundary line is circular arc shaped.

In the liquid crystal display panel of the present disclosure, the boundary line is ladder shaped.

In the liquid crystal display panel of the present disclosure, the liquid crystal display panel comprises a first substrate and a second substrate which are disposed into a cell, and a liquid crystal layer is filled between the first substrate and the second substrate. The first substrate comprises a first base, a driving circuit layer, and a pixel electrode layer, which are stacked in arrangement, and the second substrate comprises a second base, a black matrix, a color resist layer, and a common electrode, which are stacked in arrangement. A partial area of the first pixels are shielded by the black matrix.

In the liquid crystal display panel of the present disclosure, the liquid crystal display panel comprises a first substrate and a second substrate which are disposed into a cell, and a liquid crystal layer is filled between the first substrate and the second substrate. The first substrate comprises a first base, a driving circuit layer, a color resist layer, and a pixel electrode layer, which are stacked in arrangement, and the second substrate comprises a second base, a black matrix, and a common electrode, which are stacked in arrangement. A partial area of the first pixels are shielded by the black matrix.

The present disclosure further provides a display device, comprising a liquid crystal display panel and a backlight module, wherein the liquid crystal display panel comprises a display region and a non-display region disposed around the display region. The display region comprises a center region and edge regions located at four corners of the center region. The liquid crystal display panel further comprises a plurality of pixels arranged in an array, the pixels comprise a main-pixel region and a sub-pixel region, and a light transmittance of the main-pixel region is greater than a light transmittance of the sub-pixel region, wherein the pixels comprise first pixels intersecting a boundary line between the edge regions and the non-display region, a partial region of the first pixels is shielded by a black matrix, and at least two first pixels are symmetrical about a horizontal centerline of the liquid crystal display panel.

In the liquid crystal display panel of the present disclosure, in the first pixels that are symmetrical about the horizontal centerline, all the sub-pixel regions are close to the horizontal centerline, and all the main-pixel regions are away from the horizontal centerline.

In the liquid crystal display panel of the present disclosure, in the first pixels that are symmetrical about the horizontal centerline, all the main-pixel regions are close to the horizontal centerline, and all the sub-pixel regions are away from the horizontal centerline.

In the liquid crystal display panel of the present disclosure, the boundary line comprises a first boundary line and a second boundary line that are symmetrical about the horizontal centerline, and a third boundary line and a fourth boundary line that are symmetrical about the horizontal centerline. The first boundary line and the second boundary line form a first boundary group, and the third boundary line and the fourth boundary line form a second boundary group. The first pixels that are symmetrical about the horizontal centerline intersect at least one of the first boundary group or the second boundary group.

In the liquid crystal display panel of the present disclosure, the first pixels that are symmetrical about the horizontal centerline intersect the first boundary group and does not intersect the second boundary group.

In the liquid crystal display panel of the present disclosure, the first pixels that are symmetrical about the horizontal centerline intersect the second boundary group and does not intersect the first boundary group.

In the liquid crystal display panel of the present disclosure, the first pixels that are symmetrical about the horizontal centerline intersect both the first boundary group and the second boundary group.

In the liquid crystal display panel of the present disclosure, all the first pixels are symmetrical about the horizontal centerline.

Advantageous effects of the present disclosure are that the present disclosure provides a liquid crystal display panel and a display device, and the liquid crystal display panel comprises a display region and a non-display region disposed around the display region. The display region comprises a center region and edge regions located at four corners of the center region. The liquid crystal display panel further comprises a plurality of pixels arranged in an array. The pixels comprise a main-pixel region and a sub-pixel region, and a light transmittance of the main-pixel region is greater than a light transmittance of the sub-pixel region, wherein the pixels comprise first pixels intersecting a boundary line between the edge regions and the non-display region, a partial region of the first pixels is shielded by a black matrix, and at least two first pixels are symmetrical about a horizontal centerline of the liquid crystal display panel. Since the pixels comprise a main-pixel region and a sub-pixel region with different transmittances, at least two first pixels are arranged symmetrically according to the horizontal centerline, so that the light transmittance of the first pixels located above and below the horizontal centerline have a same light transmittance as the shielded portion of the non-display region, and the light transmittance of the unshielded portion is also the same, therefore the upper portion and the lower portion have same brightness, which relieves the technical problems of different brightness and viewing angles at the upper corners and the lower corners.

BRIEF DESCRIPTION OF THE SEVERAL VIEWS OF THE DRAWINGS

The following detailed description of specific embodiments of the present disclosure will make technical solutions and other advantageous effects of the present disclosure obvious in conjunction with the accompanying drawings.

DESCRIPTION OF SPECIFIC EMBODIMENTS OF THE INVENTION

Figure 1:
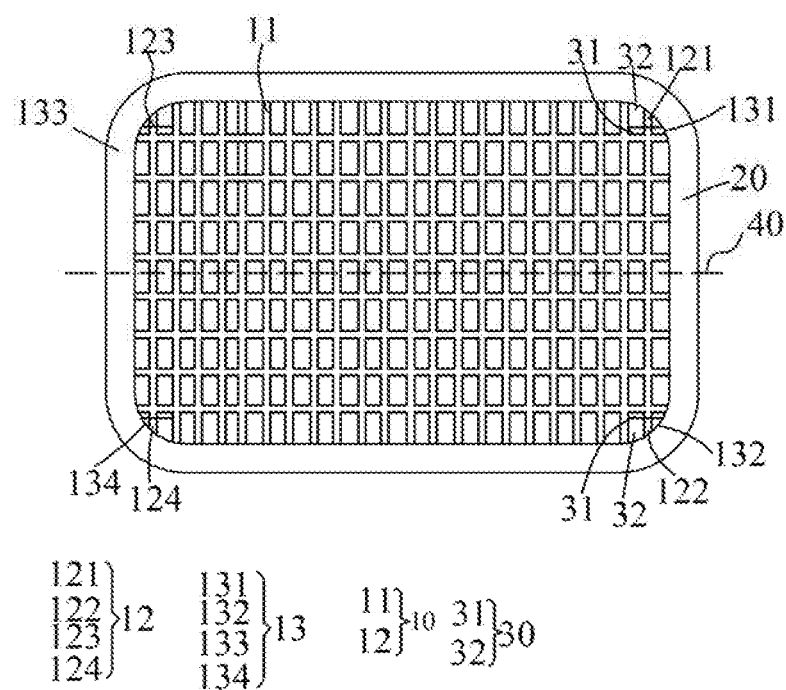
FIG. 1 is a schematic structural diagram of a liquid crystal display panel provided by an embodiment of the present disclosure.

The technical solutions in the embodiments of the present disclosure will be clearly and completely described below in conjunction with accompanying drawings in the embodiments of the present disclosure. Obviously, the embodiments described are merely a part of the present disclosure, rather than all the embodiments. All other embodiments obtained by the person having ordinary skill in the art based on embodiments of the disclosure, without making creative efforts, are within the scope of the present disclosure.

In descriptions of the present disclosure, it should be noted that, orientations or position relationships indicated by the terms, such as "center", "longitudinal", "transverse", "length", "width", "thickness", "upper", "lower", "front", "back", "left", "right", "vertical", "horizontal", "top", "bottom", "inside", "outside", "clockwise", "counterclockwise", etc. are based on the orientations or position relationships shown in the drawings. These are only convenience for describing the present disclosure and simplifying the descriptions, and does not indicate or imply that the device or element must have a specific orientation, a structure and an operation in the specific orientation, so it cannot be understood as a limitation on the present disclosure. In addition, the terms "first" and "second" are used for describing purposes only, and cannot be understood as indicating or implying relative importance or implicitly indicating the number of technical features indicated. Thus, the features defined as "first" and "second" may explicitly or implicitly include one or more of the features. In the descriptions of the present disclosure, the meaning of "plurality" is two or more, unless it is specifically defined otherwise.

In the present disclosure, the terms "mounting", "connected", "fixed" and the like should be broadly understood unless expressly stated or limited otherwise. For example, it may be fixed connected, removably connected, or integrated; it may be mechanically connected, or an electrically connected; it may be directly connected, or indirectly connected through an intermediary; it may be a connection between two elements or an interaction between two elements. For those skilled in the art, the specific meanings of the above terms in the present disclosure may be understood based on specific situations.

In the present disclosure, unless explicitly stated and defined otherwise, the first feature may be "above" or "below" the second feature and may include direct contact between the first and second features. It may also include that the first and second features are not in direct contact but are contacted by another feature between them. Moreover, the first feature is "above" the second feature, including the first feature directly above and obliquely above the second feature, or merely indicates that the first feature is higher in level than the second feature. The first feature is "below" the second feature, including the first feature is directly below and obliquely below the second feature, or only indicates that the first feature is less horizontal than the second feature.

The following disclosure provides many different embodiments or examples for achieving different structures of the present disclosure. To simplify the present disclosure, components and settings of specific examples are described below. They are only examples and are not intended to limit the present disclosure. In addition, the present disclosure may repeat reference numbers and/or reference letters in different examples, this repetition is for the purpose of simplicity and clarity, and does not itself indicate the relationship between various embodiments and/or settings discussed. In addition, the present disclosure provides examples of various specific processes and materials, but those of ordinary skill in the art may be aware of the present disclosure of other processes and/or the use of other materials.

The present disclosure provides a display panel and a display device to relieve technical problems of different brightness and viewing angles at upper round-corners and lower round-corners in current round-corner liquid crystal display panels.

Shown in FIG. 1 is a schematic structural diagram of a liquid crystal display panel provided by an embodiment of the present disclosure. The liquid crystal display panel comprises a display region 10 and a non-display region 20 disposed around the display region 10. The display region 10 comprises a center region 11 and edge regions 12 located at four corners of the center region 11. The liquid crystal display panel further comprises a plurality of pixels arranged in an array. The pixels comprise a main-pixel region 31 and a sub-pixel region 32, and a light transmittance of the main-pixel region 31 is greater than a light transmittance of the sub-pixel region 32, wherein the pixels comprise first pixels 30 intersecting a boundary line 13 between the edge regions 12 and the non-display region 20, a partial region of the first pixels 30 is shielded by a black matrix, and at least two first pixels 30 are symmetrical about a horizontal centerline 40 of the liquid crystal display panel.

The liquid crystal display panel in the embodiment of the present disclosure is a vertical alignment (VA) type liquid crystal display panel. In the VA type liquid crystal display panel, in order to achieve wide-viewing angles, the pixels are usually arranged in an eight-domain structure.

Figure 2:
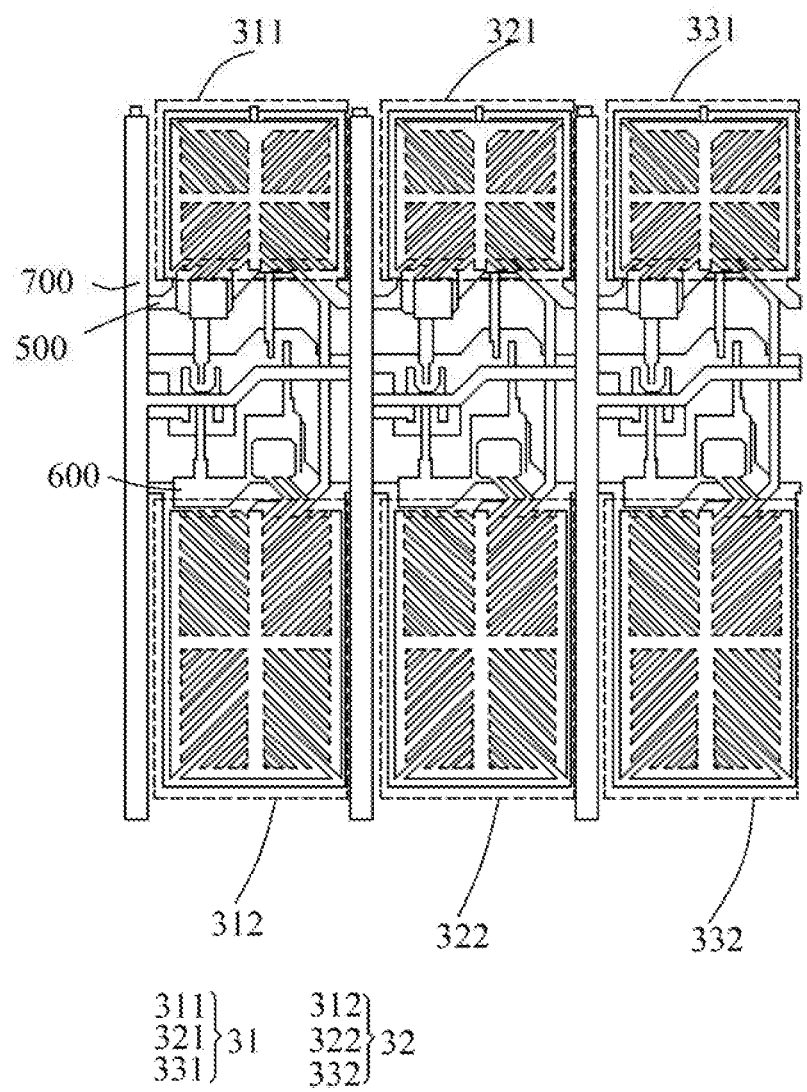
FIG. 2 is a schematic laminated structural diagram of a film layer of pixels in the liquid crystal display panel provided by the embodiment of the present disclosure.

Shown in FIG. 2 is a schematic laminated structural diagram of a film layer of pixels. The pixels comprise an active layer (not shown in figures), a first metal layer 500, a source/drain layer 600, and a pixel electrode layer 700, which are laminated. Each of the pixels comprises a red sub-pixel, a green sub-pixel, and a blue sub-pixel, wherein the red sub-pixel comprises a first main-pixel region 311 and a first sub-pixel region 312, the green sub-pixel comprises a second main-pixel region 321 and a second sub-pixel region 322, and the blue sub-pixel comprises a third main-pixel region 331 and a third sub-pixel region 332. The first main-pixel region 311, the second main-pixel region 321, and third main-pixel region 331 form a main-pixel region 31 of the pixels, and the first sub-pixel region 312, the second sub-pixel region 322, and the third sub-pixel region 332 form a sub-pixel region 32 of the pixels. In the embodiment of the present disclosure, all the first pixels 30 and other pixel structures comprise the main-pixel region 31 and sub-pixel region 32.

When the liquid crystal display panel displays, the main-pixel region 31 of the pixels is a liquid crystal operating state under a general clamping condition and a brightness is bright, and the sub-pixel region 32 is a liquid crystal operating state under a low clamping pressure and the brightness is dark; that is, a light transmittance of the main-pixel region 31 is greater than a light transmittance of the sub-pixel region 32. When the liquid crystal display panel performs display, the brightness of the main-pixel region 31 and the sub-pixel region 32 are also different to relieve a color shift phenomenon of the liquid crystal display panel due to different viewing angles in order.

As shown in FIG. 1, the pixels are arranged in an array in the liquid crystal display panel, and the pixels after the arrangement are generally rectangular. The display region 10 of the liquid crystal display panel comprises the center region 11 and the edge regions 12, wherein the edge regions 12 are distributed on the four corners of the center region 11, and the boundary line 13 is between the edge regions 12 and the non-display region 20. The pixels comprise the first pixels 30 intersecting the boundary 13. In the embodiment of the present disclosure, the four corners of the display region 10 are not right-angled structures, therefore a partial region of the pixels is shielded by the black matrix in the liquid crystal display panel, the region that is not shielded during display may emit light, and the portion of pixels is the first pixels 30.

In the present embodiment, at least two first pixels 30 are symmetrical about the horizontal centerline 40 of the liquid crystal display panel, the first pixels 30 above the horizontal centerline 40 and the first pixels 30 below the horizontal centerline 40 have same partial shielded areas and same shielded regions, and same partial unshielded areas and same unshielded regions, which are shielded by the non-display region 40. Therefore, during display, the brightness of the first pixels 30 forming a symmetrical relationship is correspondingly same, thereby relieving technical problems of different brightness and viewing angles at the upper round-corners and the lower round-corners in the liquid crystal display panels.

As shown in FIG. 1, the edge regions 12 comprise a first edge region 121 and a second edge region 122 that are symmetrical about the horizontal centerline 40, and a third edge region 123 and a fourth edge region 124 that are symmetrical about the horizontal centerline 40, wherein the boundary line 13 between the edge region 12 and the non-display region 20 comprises a first boundary line 131 between the first edge region 121 and the non-display region 20, a second boundary line 132 between the second edge region 122 and the non-display region 20, a third boundary line 133 between the third edge region 123 and the non-display region 20, and a fourth boundary line 134 between the fourth edge region 124 and the non-display region 20. The first boundary line 131 and the second boundary line 132 are symmetrical about the horizontal centerline 40 and form a first boundary group, and the third boundary line 133 and the fourth boundary line 134 are symmetrical about the horizontal centerline 40 and form a second boundary group. The first pixels 30 that are symmetrical about the horizontal centerline 40 intersect at least one of the first boundary group or the second boundary group.

In one embodiment, the first pixels 30 that are symmetrical about the horizontal centerline 40 intersects the first boundary group and does not intersect the second boundary group. At the same time, it may be that all the first pixels 30 that intersect the first boundary line 131 and all the first pixels 30 that intersect the second boundary line 132 form the symmetrical relationship, and may also be that only a portion of the first pixels 30 that intersects the first boundary line 131 and a portion of the first pixels 30 that intersects the second boundary line 132 form the symmetrical relationship.

In one embodiment, the first pixels 30 that are symmetrical about the horizontal centerline 40 intersect the second boundary group and does not intersect the first boundary group. At the same time, it may be that all the first pixels 30 that intersect the third boundary line 133 and all the first pixels 30 that intersect the fourth boundary line 134 form the symmetrical relationship, and may also be that only a portion of the first pixels 30 that intersects the third boundary line 133 and a portion of the first pixels 30 that intersects the fourth boundary line 134 form the symmetrical relationship.

In one embodiment, the first pixels 30 that are symmetrical about the horizontal centerline 40 intersect both the first boundary group and the second boundary group. At the same time, there are various cases of distribution of the first pixels 30 forming the symmetrical relationship.

In one embodiment, all the first pixels 30 that intersect the first boundary line 131 and all the first pixels 30 that intersect the second boundary line 132 form the symmetrical relationship, and all the first pixels 30 that intersect the third boundary line 133 and all the first pixels 30 that intersect the fourth boundary line 134 form the symmetrical relationship. At the same time, all the first pixels 30 in the liquid crystal display panel form the symmetrical relationship, which has a best effect of improving brightness and viewing angles.

In one embodiment, only a portion of the first pixels 30 that intersects the first boundary line 131 and a portion of the first pixels 30 that intersects the second boundary line 132 form the symmetrical relationship, and only a portion of the first pixels 30 that intersects the third boundary line 133 and a portion of the first pixels 30 that intersects the fourth boundary line 134 form the symmetrical relationship.

In one embodiment, only all the first pixels 30 that intersect the first boundary line 131 and all the first pixels 30 that intersect the second boundary line 132 form the symmetrical relationship, and only a portion of the first pixels 30 that intersects the third boundary line 133 and a portion of the first pixels 30 that intersects the fourth boundary line 134 form the symmetrical relationship.

In one embodiment, only a portion of the first pixels 30 that intersects the first boundary line 131 and a portion of the first pixels 30 that intersects the second boundary line 132 form the symmetrical relationship, and all the first pixels 30 that intersect the third boundary line 133 and all the first pixels 30 that intersect the fourth boundary line 134 form the symmetrical relationship.

In the above embodiments, the first pixels 30 that are symmetrical about the horizontal centerline 40 may be arranged in a manner that can be determined by those skilled in the art according to the needs in which regions the first pixels 30 need to be symmetrical.

FIG. 3 to FIG. 6 take the first pixels 30 disposed in the first edge region 121 and the second edge region 122 as an example to further descript a setting method of the first pixels 30 in the prior art and the embodiment of the present disclosure.

Figure 3:
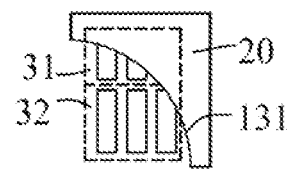
FIG. 3 is a first schematic comparison diagram of first pixels in a first edge region and a second edge region of the liquid crystal display panel in the prior art.
Figure 3:
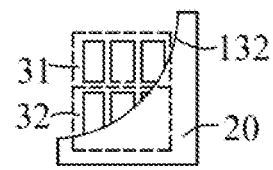

FIG. 3 is a first schematic comparison diagram of a first pixel in a first edge region and a second edge region of the liquid crystal display panel in the prior art, wherein a is the first edge region 121 and b is the second edge region 122 in FIG. 3. In the liquid crystal display panel, the pixels are arranged in an array, and each of the main-pixel region 31 of the pixels is arranged in an upper row and the sub-pixel region 32 in a lower row; therefore, for the two first pixels 30 that are positioned symmetrically about the horizontal centerline 40, a shielded portion of the first pixel 30 intersecting with the first boundary line 131 is mostly the main-pixel region 31 and less of the sub-pixel region 32 thereof; meanwhile, a shielded portion of the first pixel 30 intersecting with the second boundary line 132 is mostly the sub-pixel region 32 and less of the main-pixel region 31 thereof. Because the two regions are different and the light transmittances of the different regions are different, the brightness and viewing angles of the first edge region 121 and the second edge region 122 are also different during display, and the display effect is poor.

Figure 4:
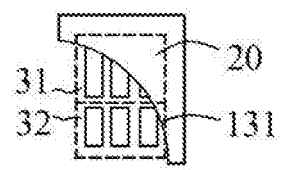
FIG. 4 is a second schematic comparison diagram of the first pixels in the first edge region and the second edge region of the liquid crystal display panel in the prior art.
Figure 4:
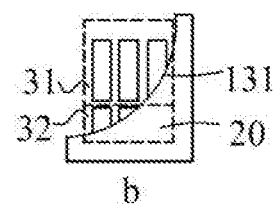

FIG. 4 is a second schematic comparison diagram of the first pixel in the first edge region and the second edge region of the liquid crystal display panel in the prior art, wherein a is the first edge region 121 and b is the second edge region 122 in FIG. 4. In the liquid crystal display panel, the pixels are arranged in an array, and each of the main-pixel region 31 of the pixels is arranged in the lower row and the sub-pixel region 32 in the upper row; therefore, for the two first pixels 30 that are positioned symmetrically about the horizontal centerline 40, a shielded portion of the first pixel 30 intersecting with the first boundary line 131 is mostly the sub-pixel region 32 and less of the main-pixel region 31 thereof; meanwhile, a shielded portion of the first pixel 30 intersecting with the second boundary line 132 is mostly the main-pixel region 31 and less of the sub-pixel region 32 thereof. Because the two regions are different and the light transmittances of the different regions are different, the brightness and viewing angles of the first edge region 121 and the second edge region 122 are also different during display, and the display effect is poor.

Figure 5:
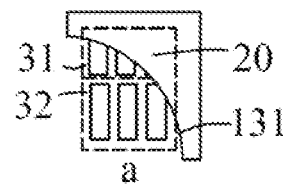
FIG. 5 is a first schematic comparison diagram of first pixels in a first edge region and a second edge region of the liquid crystal display panel in the liquid crystal display panel provided by the embodiment of the present disclosure.
Figure 5:
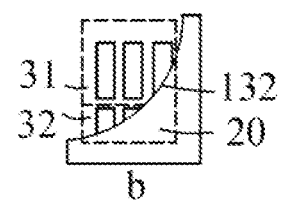

FIG. 5 is a first schematic comparison diagram of a first pixel in a first edge region and a second edge region of the liquid crystal display panel in the liquid crystal display panel provided by the embodiment of the present disclosure, wherein a is the first edge region 121 and b is the second edge region 122 in FIG. 5. In the liquid crystal display panel, the pixels are arranged in an array, and first pixels 30 intersecting the first boundary line 131 and the first pixels 30 intersecting the second boundary line 132 are symmetrical about the horizontal centerline 40. In the first edge region 121, the main-pixel region 31 of the pixels is arranged in the upper row and the sub-pixel region 32 in the lower row, and in the second edge region 122, the main-pixel region 31 of the pixels is arranged in the lower row and the sub-pixel region 32 in the upper row, that is, both of the sub-pixel regions 32 are close to the horizontal centerline 40, and the main-pixel regions 31 are away from the horizontal centerline 40. Therefore, for at least two first pixels 30 that are positioned symmetrically about the horizontal centerline 40, a portion shielded by the non-display region 20 of the first pixels 30 intersecting with the first boundary line 131 and the second boundary line 132 is mostly the main-pixel region 31 and less of the sub-pixel region 32 thereof, and both shielded areas are same, so the brightness and viewing angles of the first edge region 121 and the second edge region 122 are same during display, and the display effect is better.

Figure 6:
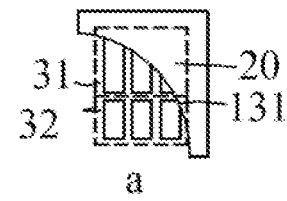
FIG. 6 is a second schematic comparison diagram of the first pixels in the first edge region and the second edge region of the liquid crystal display panel in the liquid crystal display panel provided by the embodiment of the present disclosure.
Figure 6:
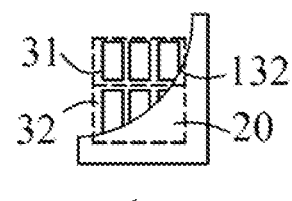

FIG. 6 is a second schematic comparison diagram of the first pixel in the first edge region and the second edge region of the liquid crystal display panel in the liquid crystal display panel provided by the embodiment of the present disclosure, wherein a is the first edge region 121 and b is the second edge region 122 in FIG. 6. In the liquid crystal display panel, the pixels are arranged in an array, and first pixels 30 intersecting the first boundary line 131 and the first pixels 30 intersecting the second boundary line 132 are symmetrical about the horizontal centerline 40. In the first edge region 121, the main-pixel region 31 of the pixels is arranged in the lower row and the sub-pixel region 32 in the upper row, and in the second edge region 122, the main-pixel region 31 of the pixels is arranged in the upper row and the sub-pixel region 32 in the lower row, that is, both of the sub-pixel regions 32 are away from the horizontal centerline 40, and the main-pixel regions 31 are close to the horizontal centerline 40. Therefore, for at least two first pixels 30 that are positioned symmetrically about the horizontal centerline 40, a portion shielded by the non-display region 20 of the first pixels 30 intersecting with the first boundary line 131 and the second boundary line 132 is mostly the sub-pixel region 32 and less of the main-pixel region 31 thereof, and both shielded areas are same, so the brightness and viewing angles of the first edge region 121 and the second edge region 122 are same during display, and the display effect is better.

In FIG. 5 and FIG. 6, except for the first pixels 30 which form a symmetrical relationship, there are no restrictions on the arrangement of other pixels. Designers in the present field may set the upper and the lower relationships between the main-pixel region 31 and the sub-pixel region 32 in other pixels as required.

In the embodiment of the present disclosure, the four corners of the display region 10 of the liquid crystal display panel are not right-angles, and the boundary line 13 of each of the edge regions 12 and the non-display region 20 may be circular arc shaped or ladder shaped to achieve roundedcorners in a macro view.

The embodiment of the present disclosure adopts various structures in the prior art to improve the first pixels 30, such as 3 thin film transistors (3TFT) structures, charge sharing structures, 2 data & 1 gate (2D1G) structures, etc., but it is not limited herein. Secondly, it is not limited to any driving form, and 1 gate & 1 data (1G1D), half gate & 2 data (HG2D), TriGate, data line sharing (DLS), etc. are all applicable. Moreover, the liquid crystal display panel provided by the embodiment of the present disclosure may comprise a multi domain VA method achieved by any process such as a multi domain vertical (MVA) method, polymer stabilized alignment (PSA), photo-alignment technology $(UV^2A)$-VA, etc.

The liquid crystal display panel of the present disclosure may also comprise various structures, in one embodiment, the liquid crystal display panel comprises a first substrate and a second substrate which are disposed into a cell, and a liquid crystal layer is filled between the first substrate and the second substrate. The first substrate comprises a first base, a driving circuit layer, and a pixel electrode layer, which are stacked in arrangement, and the second substrate comprises a second base, a black matrix, a color resist layer, and a common electrode, which are stacked in arrangement. A partial area of the first pixels are shielded by the black matrix. Meanwhile, the first substrate is an array substrate, the second substrate is a color film substrate, and a partial area of first pixels 30 are shielded by the black matrix of a non-display region.

In one embodiment, the liquid crystal display panel comprises a first substrate and a second substrate which are disposed into a cell, and a liquid crystal layer is filled between the first substrate and the second substrate. The first substrate comprises a first base, a driving circuit layer, a color resist layer, and a pixel electrode layer, which are stacked in arrangement, and the second substrate comprises a second base, a black matrix, and a common electrode, which are stacked in arrangement. A partial area of first pixels is shielded by a black matrix. The difference from the above embodiment is that in the present embodiment, the first substrate is an array color film substrate, that is, the color resist layer and the driving circuit layer are formed on the same substrate, and a partial area of first pixels 30 are shielded by the black matrix of a non-display region.

The embodiment of the present disclosure improves the first pixel 30, which is applicable to the liquid crystal display panel of these two structures.

The present disclosure further provides a display device, comprising a liquid crystal display panel and a backlight module. The liquid crystal display panel comprises a display region and a non-display region disposed around the display region. The display region comprises a center region and edge regions located at four corners of the center region. The liquid crystal display panel further comprises a plurality of pixels arranged in an array. The pixels comprise a mainpixel region and a sub-pixel region, and a light transmittance of the main-pixel region is greater than a light transmittance of the sub-pixel region, wherein the pixels comprise first pixels intersecting a boundary line between the edge regions and the non-display region, a partial region of the first pixels is shielded by a black matrix, and at least two first pixels are symmetrical about a horizontal centerline of the liquid crystal display panel.

In one embodiment, in the first pixels that are symmetrical about the horizontal centerline, all the sub-pixel regions are close to the horizontal centerline, and all the main-pixel regions are away from the horizontal centerline.

In one embodiment, in the first pixels that are symmetrical about the horizontal centerline, all the main-pixel regions are close to the horizontal centerline, and all the sub-pixel regions are away from the horizontal centerline.

In one embodiment, the boundary line comprises a first boundary line and a second boundary line that are symmetrical about the horizontal centerline, and a third boundary line and a fourth boundary line that are symmetrical about the horizontal centerline. The first boundary line and the second boundary line form a first boundary group, and the third boundary line and the fourth boundary line form a second boundary group. The first pixels that are symmetrical about the horizontal centerline intersect at least one of the first boundary group or the second boundary group.

In one embodiment, the first pixels that are symmetrical about the horizontal centerline intersect the first boundary group and does not intersect the second boundary group.

In one embodiment, the first pixels that are symmetrical about the horizontal centerline intersect the second boundary group and does not intersect the first boundary group.

In one embodiment, the first pixels that are symmetrical about the horizontal centerline intersect both the first boundary group and the second boundary group.

In one embodiment, all the first pixels are symmetrical about the horizontal centerline.

In one embodiment, the boundary line is circular arc shaped.

In one embodiment, the boundary line is ladder shaped.

In one embodiment, the liquid crystal display panel comprises a first substrate and a second substrate which are disposed into a cell, and a liquid crystal layer is filled between the first substrate and the second substrate. The first substrate comprises a first base, a driving circuit layer, and a pixel electrode layer, which are stacked in arrangement, and the second substrate comprises a second base, a black matrix, a color resist layer, and a common electrode, which are stacked in arrangement. A partial area of the first pixels are shielded by the black matrix.

In one embodiment, the liquid crystal display panel comprises a first substrate and a second substrate which are disposed into a cell, and a liquid crystal layer is filled between the first substrate and the second substrate. The first substrate comprises a first base, a driving circuit layer, a color resist layer, and a pixel electrode layer, which are stacked in arrangement, and the second substrate comprises a second base, a black matrix, and a common electrode, which are stacked in arrangement. A partial area of the first pixels are shielded by the black matrix.

According to the above embodiment, the present disclosure provides the liquid crystal display panel and the display device, and the liquid crystal display panel comprises the display region and the non-display region disposed around the display region. The display region comprises the center region and the edge regions located at the four corners of the center region. The liquid crystal display panel further comprises the plurality of pixels arranged in an array, the pixels comprise the main-pixel region and the sub-pixel region, and the light transmittance of the main-pixel region is greater than the light transmittance of the sub-pixel region, wherein the pixels comprise first pixels intersecting the boundary line between the edge regions and the non-display region, a partial region of the first pixels are shielded by the black matrix, and at least two first pixels are symmetrical about the horizontal centerline of the liquid crystal display panel. Since the pixels comprise the main-pixel region and the sub-pixel region with different transmittances, at least two first pixels are arranged symmetrically according to the horizontal centerline, so that the light transmittance of the first pixels located above and below the horizontal centerline have the same light transmittance as the shielded portion of the non-display region, and the light transmittance of the unshielded portion is also the same; therefore, the upper portion and the lower portion have same brightness, which relieves the technical problems of different brightness and viewing angles at the upper corners and the lower corners.

As mentioned above, while the present disclosure has been disclosed via preferred embodiments as above, the preferred embodiments are not intended to limit the disclosure. Those skilled in the art can make various modifications and alternations without departing from the spirit and scope of the disclosure. The scope of protection of the disclosure is defined by the claims.

What is claimed is:

1. A liquid crystal display panel, comprising:
   a display region and a non-display region disposed around the display region, wherein the display region comprises a center region and edge regions located at four corners of the center region; and
   a plurality of pixels arranged in an array, wherein the pixels comprise a main-pixel region and a sub-pixel region, and a light transmittance of the main-pixel region is greater than a light transmittance of the sub-pixel region;
   wherein the pixels comprise first pixels intersecting a boundary line between the edge regions and the non-display region, a partial region of the first pixels is shielded by a black matrix, and at least two first pixels are symmetrical about a horizontal centerline of the liquid crystal display panel.

2. The liquid crystal display panel as claimed in claim 1, wherein in the first pixels that are symmetrical about the horizontal centerline, all the sub-pixel regions are close to the horizontal centerline, and all the main-pixel regions are away from the horizontal centerline.

3. The liquid crystal display panel as claimed in claim 1, wherein in the first pixels that are symmetrical about the horizontal centerline, all the main-pixel regions are close to the horizontal centerline, and all the sub-pixel regions are away from the horizontal centerline.

4. The liquid crystal display panel as claimed in claim 1, wherein the boundary line comprises a first boundary line and a second boundary line that are symmetrical about the horizontal centerline, and a third boundary line and a fourth boundary line that are symmetrical about the horizontal center line;
   the first boundary line and the second boundary line form a first boundary group, and the third boundary line and the fourth boundary line form a second boundary group; and
   the first pixels that are symmetrical about the horizontal centerline intersect at least one of the first boundary group or the second boundary group.

5. The liquid crystal display panel as claimed in claim 4, wherein the first pixels that are symmetrical about the horizontal centerline intersect the first boundary group and does not intersect the second boundary group.

6. The liquid crystal display panel as claimed in claim 4, wherein the first pixels that are symmetrical about the horizontal centerline intersect the second boundary group and does not intersect the first boundary group.

7. The liquid crystal display panel as claimed in claim 4, wherein the first pixels that are symmetrical about the horizontal centerline intersect both the first boundary group and the second boundary group.

8. The liquid crystal display panel as claimed in claim 7, wherein all the first pixels are symmetrical about the horizontal centerline.

9. The liquid crystal display panel as claimed in claim 1, wherein the boundary line is circular arc shaped.

10. The liquid crystal display panel as claimed in claim 1, wherein the boundary line is ladder shaped.

11. The liquid crystal display panel as claimed in claim 1, wherein the liquid crystal display panel comprises a first substrate and a second substrate which are disposed into a cell, and a liquid crystal layer is filled between the first substrate and the second substrate;

the first substrate comprises a first base, a driving circuit layer, and a pixel electrode layer, which are stacked in arrangement, and the second substrate comprises a second base, a black matrix, a color resist layer, and a common electrode, which are stacked in arrangement; and a partial area of the first pixels is shielded by the black matrix.

12. The liquid crystal display panel as claimed in claim 1, wherein the liquid crystal display panel comprises a first substrate and a second substrate which are disposed into a cell, and a liquid crystal layer is filled between the first substrate and the second substrate;

the first substrate comprises a first base, a driving circuit layer, a color resist layer, and a pixel electrode layer, which are stacked in arrangement, and the second substrate comprises a second base, a black matrix, and a common electrode, which are stacked in arrangement; and a partial area of the first pixels is shielded by the black matrix.

13. A display device, comprising a liquid crystal display panel and a backlight module, wherein the liquid crystal display panel comprises:

a display region and a non-display region disposed around the display region, wherein the display region comprises a center region and edge regions located at four corners of the center region; and a plurality of pixels arranged in an array, wherein the pixels comprise a main-pixel region and a sub-pixel region, and a light transmittance of the main-pixel region is greater than a light transmittance of the sub-pixel region;

wherein the pixels comprise first pixels intersecting a boundary line between the edge regions and the non-display region, a partial region of the first pixels is shielded by a black matrix, and at least two first pixels are symmetrical about a horizontal centerline of the liquid crystal display panel.

14. The display device as claimed in claim 13, wherein in the first pixels that are symmetrical about the horizontal centerline, all the sub-pixel regions are close to the horizontal centerline, and all the main-pixel regions are away from the horizontal centerline.

15. The display device as claimed in claim 13, wherein in the first pixels that are symmetrical about the horizontal centerline, all the main-pixel regions are close to the horizontal centerline, and all the sub-pixel regions are away from the horizontal centerline.

16. The display device as claimed in claim 13, wherein the boundary line comprises a first boundary line and a second boundary line that are symmetrical about the horizontal centerline, and a third boundary line and a fourth boundary line that are symmetrical about the horizontal center line;

the first boundary line and the second boundary line form a first boundary group, and the third boundary line and the fourth boundary line form a second boundary group; and the first pixels that are symmetrical about the horizontal centerline intersect at least one of the first boundary group or the second boundary group.

17. The display device as claimed in claim 16, wherein the first pixels that are symmetrical about the horizontal centerline intersect the first boundary group and does not intersect the second boundary group.

18. The display device as claimed in claim 16, wherein the first pixels that are symmetrical about the horizontal centerline intersect the second boundary group and does not intersect the first boundary group.

19. The display device as claimed in claim 16, wherein the first pixels that are symmetrical about the horizontal centerline intersect both the first boundary group and the second boundary group.

20. The display device as claimed in claim 19, wherein all the first pixels are symmetrical about the horizontal centerline.

* * * * *